(12) United States Patent
Gleason

(10) Patent No.: US 6,398,228 B1
(45) Date of Patent: Jun. 4, 2002

(54) BICYCLE DUEL BUNNS

(76) Inventor: Eugene A. Gleason, P.O. Box 50101, San Diego, CA (US) 92165

( * ) Notice: Subject to any disclaimer, the term of this patent is extended or adjusted under 35 U.S.C. 154(b) by 0 days.

(21) Appl. No.: 09/307,383

(22) Filed: May 7, 1999

(51) Int. Cl.[7] .............................................. A63C 17/88
(52) U.S. Cl. .................................................... 280/7.16
(58) Field of Search ................................ 280/7.1, 7.15, 280/7.16, 230

(56) References Cited

U.S. PATENT DOCUMENTS

| | | | | |
|---|---|---|---|---|
| 602,536 A | * | 4/1898 | Bassett | 280/7.16 |
| 611,780 A | * | 10/1898 | Fetzer | 280/7.16 |
| 2,227,799 A | * | 1/1941 | Sizelove | 280/7.16 |
| 2,516,352 A | * | 7/1950 | Stewart | 280/7.16 |
| 3,092,362 A | * | 6/1963 | Walsh | 280/7.16 |
| 4,029,326 A | * | 6/1977 | Blow, Jr. | 280/7.16 |
| 5,503,419 A | * | 4/1996 | Gardner | 280/7.16 |

* cited by examiner

*Primary Examiner*—Robert P. Olszewski
*Assistant Examiner*—Andrew J. Fischer

(57) ABSTRACT

A dual seat adaptor for a bicycle that allows a second person to ride on a conventional bicycle. Both a front seat post and a rear seat post are telescopically received in the respective front and rear seat post sleeves that are the most important structure of the dual seat adaptor. The front seat post sleeve is telescopically received in the top end of the seat supporting tube of the conventional bicycle.

5 Claims, 3 Drawing Sheets

BICYCLE DUEL BUNNS

BACKGROUND OF THE INVENTION

(1) Field of the Invention

The present invention relates to transportation and expanding the ability to accommodate two riders on a single rider bicycle. If you can ride a bicycle, this adaptor will enhance your skills.

(2) Prior Art

This invention is public transportation friendly. It is also environment friendly, pollution free, and easily adaptable to crowded areas. The public transportation buses are equipped with bicycle racks on the front of all bases buses in San Diego County from San Ysidro, Calif. (Mexican border) to Oceanside, Calif. The trolley has accommodations for bicycles on board that travel from the Mexican Border through San Diego to outlying communities. I've owned a bicycle-built-for-two for in excess of twenty years. I was never able to get into areas that I've been able to go with my prototype adaptation ten and twenty one speed bicycle.

SUMMARY OF THE INVENTION

The principal object of the present invention is to provide a device for use in transportation in a time when there is a proliferation of the use of mass transportation of all descriptions. I feel privileged to offer my contribution. This is not re-inventing the bicycle, but offering an improvement to make it more useful to serve the masses who enjoy the freedom of cycling. You can use your own ability and strength to motivate how long and where you ride. Exercise in one of its purest forms, there are few that support the environment. The invention embodiments are formed by a plurality of tubular sections being fitted together and it is portable at the discretion of the riders. It enhances the appearance of the bicycle. The seats are adjustable to fit the need of the riders leg length for comfort.

DETAILED DESCRIPTION OF THE PREFERRED EMBODIMENT

Figure 1:
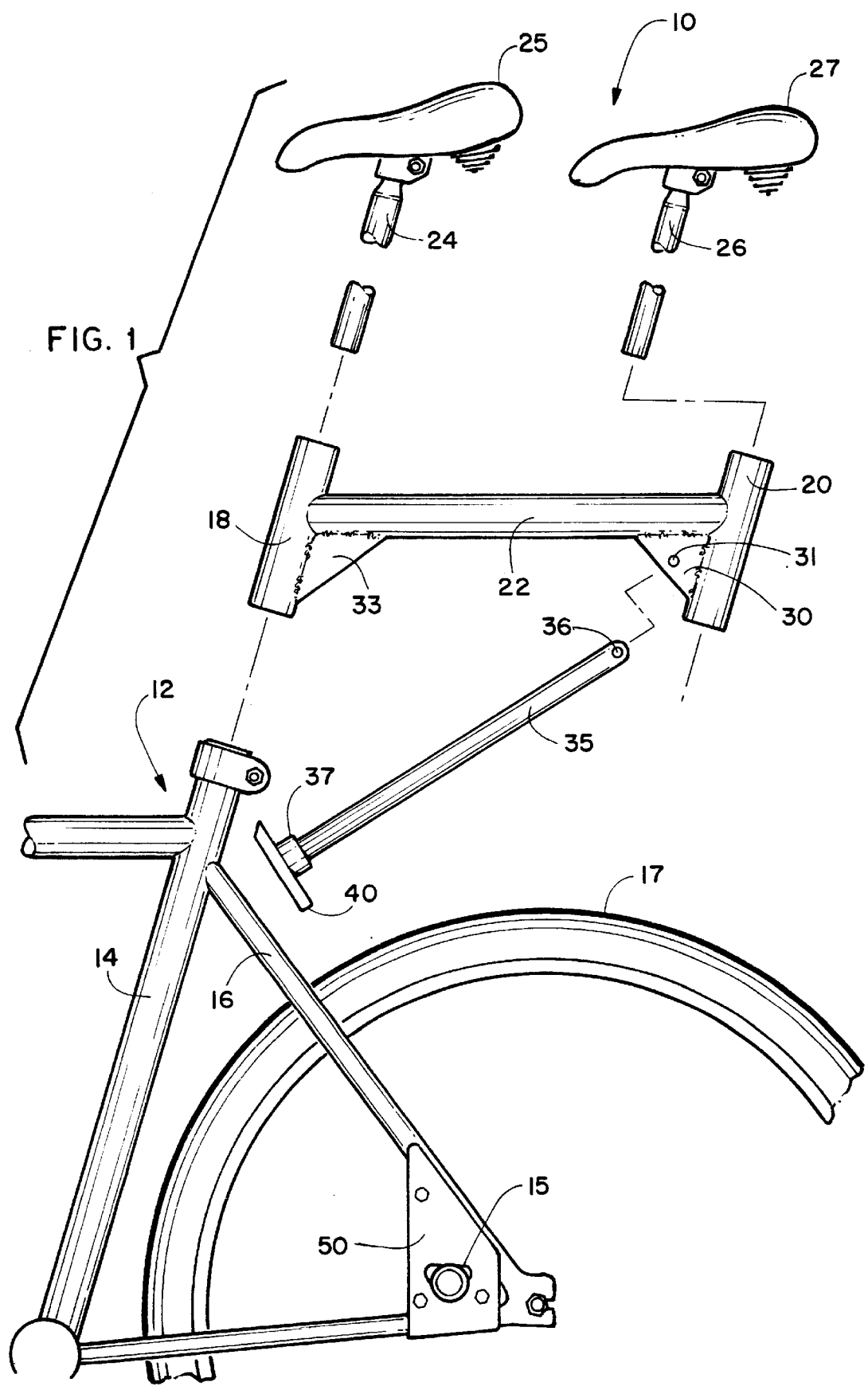
FIG. 1 is an exploded partial side elevation view of a bicycle showing the manner in which the dual seat adaptor is mounted on a bicycle.

As shown in the drawings, the simplicity of the dual seat adaptor allows for installation to be done with few tools. For security the attachment can be permanent or portable and only requires a small area for storage. The adaptor seat has no adverse bearing on the use of the bicycle by a single participant. The visibility is spectacular from the front or rear seats. The proliferation of bicycles requires us to enhance the concepts.

This invention embodiment is formed by a plurality of tubular sections fitted together, forming a tubular metal triangle, encompassing the seat post of the principle rider. An adjacent bicycle frame with adjustment in the brace to adjust any slack in brace to form a rigid triangle with adequate strength to support two persons body weight without compromising the integrity of the bicycle structure in normal use.

The dual seat adaptor is generally designated numeral 10 and it will now be described by referring to FIG. 1. FIG. 1 is an exploded partial side elevation view of a bicycle 12 showing the manner in which the dual seat adaptor is mounted thereon. The seat support tube 14 and the rear fork 16 of the bicycle frame 12 are shown in this figure. Dual seat adaptor 10 has a tubular front seat post sleeve 18, a tubular rear seat post sleeve 20, and a tubular connecting frame member 22 as its major components. Front seat post 24 has a front seat 25 mounted on its top end. The bottom end of front seat post 24 is telescopically received in tubular front seat post sleeve 18. A rear seat post 26 has a rear seat 27 mounted on its top end. The bottom end of rear seat post 26 is telescopically received in tubular rear seat post 20. Tubular front seat post sleeve 18 and tubular rear seat post sleeve 20 are approximately 4 inches in length. Connecting frame member 22 is approximately 12 inches long.

A gusset 30 having an aperture 31 therein is rigidly secured to connecting frame member 22 and rear seat post sleeve 20 where they intersect. A gusset 33 is rigidly connected to connecting frame member 22 and front seat post sleeve 18 where they intersect each other. A brace member 35 has an aperture 36 adjacent its top end and a pin {not shown} would pivotally secure these two members together. The bottom end of brace member 35 is rigidly secured in a tubular socket 37 that is rigidly secured to the attachment clamp member 40. Attachment clamp member 40 is shown in its elongated unbent configuration and will be later shown in its bent configuration in FIG. 4.

Figure 2:
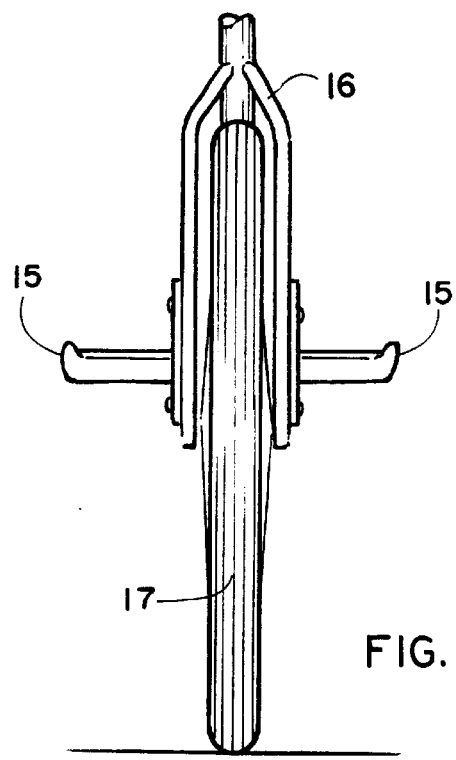
FIG. 2 is a partial rear elevation view of a bicycle showing the footrests attached thereon.

FIG. 2 is a rear partial elevation view of the rear end of bicycle 12 showing rear fork member 16 and rear tire 17. A pair of rear seat footrests 15 extend outwardly from opposite sides of rear tire 17.

Figure 3:
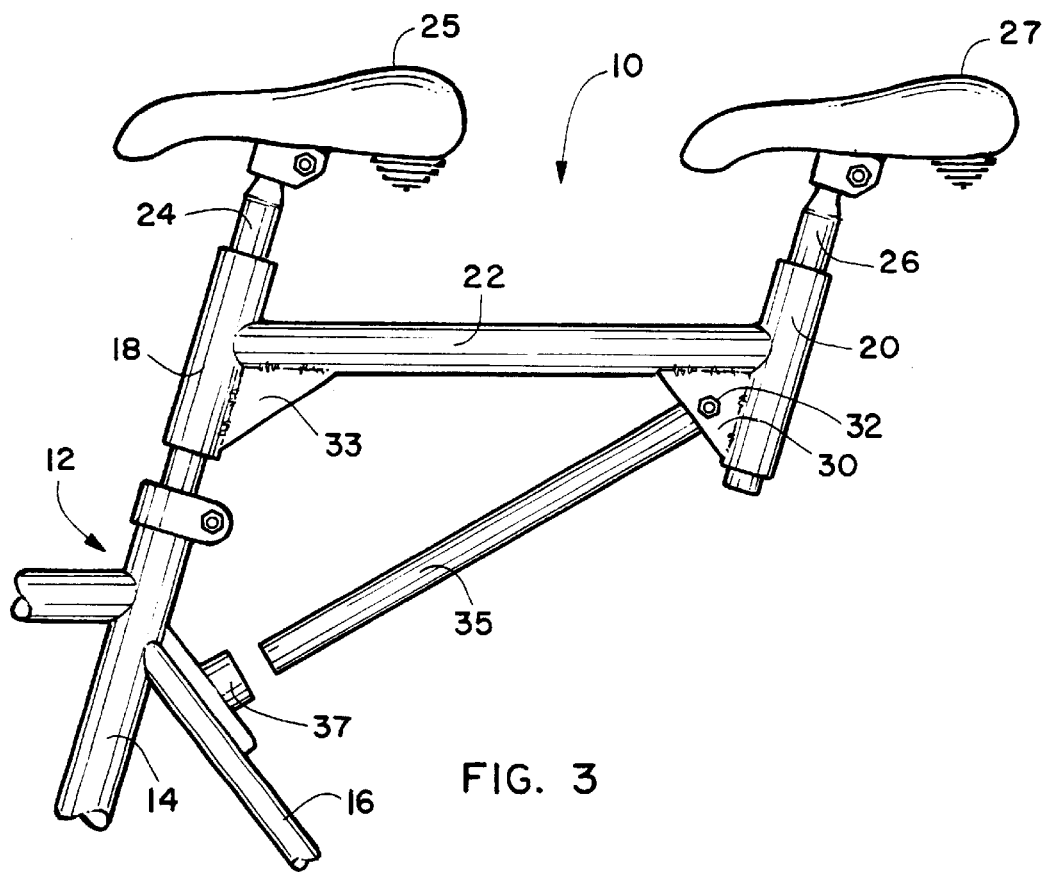
FIG. 3 is an exploded partial side elevation view similar to that of FIG. 1 showing the dual seat adaptor having a much longer brace member.

FIG. 3 is an exploded partial side elevation view similar to that of FIG. 1 showing the dual seat adaptor 10 having a much longer brace member 35. Also a pin 33 is shown pivotally securing the top end of brace member 35 to gusset 30.

Figure 4:
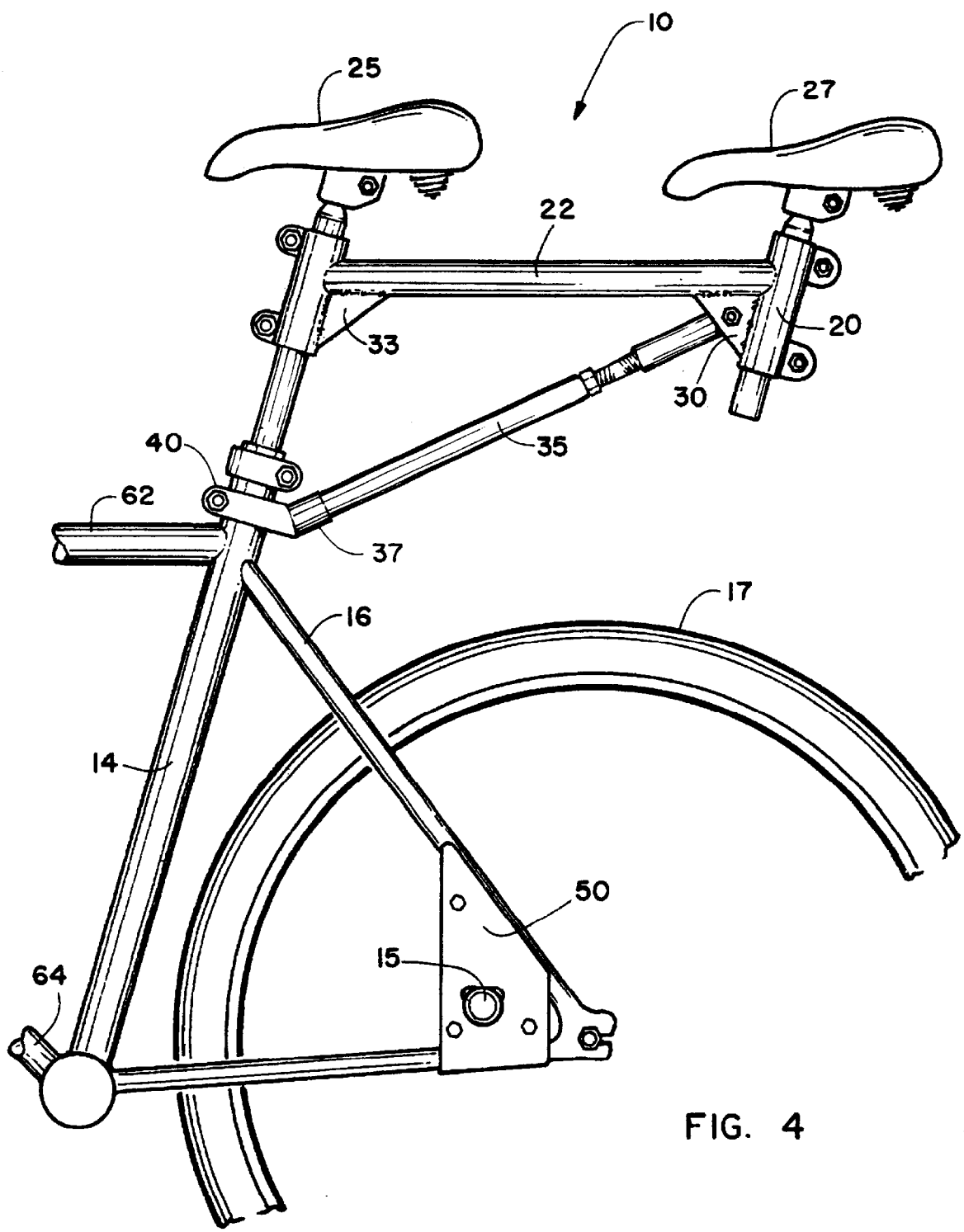
FIG. 4 is an exploded partial side elevation view similar to that of FIG. 1 showing where the footrest 5 and footrest spoke shields would be mounted.

FIG. 4 is an exploded partial side elevation view similar to that of FIG. 1 showing where the footrest 15 and footrest spoke shield 50 would be mounted. More details of the bicycle 12 are seen. An annular collar 60 is seen at the top end of seat supporting tube 14. Also viewed are top frame member 62 and another frame member 64.

What is claimed is:

1. A dual seat adaptor for a bicycle comprising:

an upright oriented elongated tubular front seat post sleeve having a top end, a bottom end, a front surface, a rear surface and a bore extending downwardly from said top end for receiving a front seat post;

an upright oriented elongated tubular rear seat post sleeve having a top end, a bottom end, a front surface, a rear surface and a bore extending downwardly from said top end for receiving a rear seat post; said tubular rear seat post sleeve being spaced rearwardly from said tubular front seat post sleeve;

an elongated tubular connecting frame member having a front end and a rear end; said front end of said tubular connecting frame member being rigidly secured to said rear surface of said tubular front seat post sleeve; said rear end of said tubular connecting frame member being rigidly secured to said front surface of said tubular rear seat post sleeve;

a first gusset rigidly secured to said tubular connecting frame member and said tubular rear seat post sleeve where they intersect each other;

an elongated tubular brace member having a top end and a bottom end; structure pivotally securing said top end of said tubular brace member to said first gusset;

an attachment clamp member for releasable attachment to a seat support of a bicycle (that is releasably secured to said front seat post sleeve); and structure for rigidly securing said bottom end of said tubular brace member to said attachment clamp member.

2. A dual seat adaptor for a bicycle as recited in claim 1 wherein said tubular front seat post sleeve and said tubular rear seat post sleeve are aligned substantially parallel to each other.

3. A dual seat adaptor for a bicycle as recited in claim 1 further comprising a front seat post attached to the bottom of a front seat; said front seat post having a bottom end that is telescopically received in said top end of said tubular front seat post sleeve.

4. A dual seat adaptor for a bicycle as recited in claim 3 further comprising a rear seat post attached to the bottom of a rear seat; said rear seat post having a bottom end that is telescopically received in said top end of said tubular rear seat post sleeve.

5. A dual seat adaptor for a bicycle as recited in claim 4 in combination with a bicycle having a frame having a tubular seat supporting tube having a top end; said bottom end of said tubular front seat post sleeve is telescopically received in said top end of said tubular seat supporting tube of said bicycle frame.

* * * * *